2,903,432
ANTI-FOAM AGENT AND PROCESS OF INHIBITING FOAM

Chih Ming Hwa, Chicago, Ill., assignor to Dearborn Chemical Company, Chicago, Ill., a corporation of Illinois No Drawing. Application December 27, 1956
Serial No. 630,744

17 Claims. (Cl. 252—321)

The present invention is directed to compositions and methods for inhibiting the formation of foam and for collapsing exiting foam in aqueous systems.

The methods and compositions of the present invention are particularly useful in the treatment of aqueous stock suspensions of paper-making fibers. Problems of foaming are particularly troublesome in the paper-making industry since many of the ingredients in the paper-making furnish contribute to the production of a stable foam in the papermaking stock, particularly when the stock is severely agitated in the beater. The presence of this foam on a foraminous forming surface, such as the ordinary Fourdrinier wire, adversely affects the efficiency of the dewatering operation and may affect adversely the quality of the web deposited on the forming wire.

Accordingly, an object of the present invention is to provide an improved method for inhibiting the tendency of paper-making stock suspensions to foam and for collapsing existing foam in such suspensions.

A further object of the invention is to provide improved compositions for treating paper-making stock suspensions in order to eliminate or minimize the foaming problem.

Still another object of the invention is to provide stable emulsions of foam-suppressing agents particularly useful in the treatment of paper-making stock suspensions.

I have now found that the foaming problem incident to paper-making operations can be substantially reduced, if not eliminated, by adding to the paper-making stock suspension a still bottoms fraction recovered from the distillation of an aliphatic alcohol containing from 12 to 20 carbon atoms per molecule. The still bottoms fraction referred to remain after the distillation of the desired alcohol from the reaction product prepared from a sodium reduction of either the corresponding acid or its glyceride, as described, for example, in Henke et al. Patent No. 2,070,597. The still bottoms fractions are quite complex chemically and may contain some of the residual alcohol, polymers, oxidized materials, high molecular weight alcohols, and ketone alcohols containing up to 36 carbon atoms. The still bottoms fractions are available commercially under the trademark "Tagols" and are marketed by the Archer-Daniels-Midland Company.

The properties of some of the commercially available "Tagols" are given in the following table:

Table I

| Material | Still bottoms residue of | Properties |
|---|---|---|
| Tagol A–10 | lauryl alcohol ($C_{12}H_{25}OH$) | Saponification value: 30.4. Iodine value: 67.8. Acetyl value: 74.4. |
| Tagol A–34 | oleyl alcohol ($C_{18}H_{35}OH$) | Saponification value: 38.7. Iodine value: 50.1. Acetyl value: 71.8. |
| Tagol A–40 | ricinoleyl alcohol ($C_{18}H_{34}(OH)_2$) | Saponification value: 30.3. Iodine value: 61.0. Acetyl value: 177.2. |
| Tagol A–65 | cetyl alcohol ($C_{16}H_{33}OH$) and stearyl alcohol ($C_{18}H_{37}OH$). | Saponification value: 40.8. Iodine value: 31.6. Acetyl value: 43.0. |
| Tagol U–90 | linoleyl alcohol ($C_{18}H_{33}OH$) and linolenyl alcohol ($C_{18}H_{31}OH$). | Saponification value: 34.2. Iodine value: 104.4. Acetyl value: 102.0. |

The "Tagol A–34" product mentioned above is produced by a sodium reduction at a temperature from about 265 to 325° F. at pressures less than one pound per square inch. The distillation is carried out at 450 to 550° F. at 15 millimeters mercury pressure or less. The other "Tagols" are distilled at temperatures ranging from about 280° to about 420° F. at 15 millimeters mercury pressure or less. The "Tagols" are the residues left over in the still pot after the distillation processes.

While the still bottoms fraction may be employed alone in the treatment of the paper making stock, considerably improved results are obtained if the fraction is combined in the form of an aqueous emulsion with a non-ionic emulsifying agent, such as an ester of a polyethylene glycol. For example, very successful results have been obtained by employing an aqueous emulsion containing about 45% by weight of the still bottoms residue derived from the distillation of oleyl alcohol, about 5% by weight of the mono-oleate ester of a polyethylene glycol having an average molecular weight of 400 ("polyethylene glycol 400") and about 50% water. The dioleate ester of the same glycol can also be employed as an emulsifying agent. A polyoxyethylene sorbitan trioleate having an average molecular weight of about 1,800, and a polyoxyethylene lauryl alcohol having an average molecular weight of about 1,200 are also satisfactory emulsifying agents. In addition to the foregoing, non-ionic agents such as "Ucon LB–1715" may also be included in the composition. "Ucon LB–1715" (Carbide and Carbon Chemicals Corporation) is the polyoxypropylene butyl alcohol having a molecular weight of approximately 2,100 derived by the addition of 1,2 propylene oxide to butyl alcohol.

The relative amounts of the ingredients in the aqueous emulsion can vary considerably but I prefer to use an amount of the still bottoms fraction in the range from about ½ to 2 times the amount of water present. The emulsifying agent is added in amounts sufficient to produce a stable emulsion and this usually amounts to the addition of from 1 to 10% by weight of the emulsifying agent based on the total weight of the emulsion.

An improved method for testing the foam-inhibiting efficiency of the composition was developed for evaluating the compositions of the invention, and comparing their effectiveness with the effectiveness of previously used compositions.

of about 7,200 r.p.m. for 10 minutes. The agitation was discontinued and the height of foam produced was then measured during a period of 5 minutes.

The following table illustrates the results achieved from this test when employing conventional paper stock foam inhibitors, and also when employing the compositions of the present invention:

Table III

| Additive | Dosage, drops | Anti-Foam property evaluated | Height of foam produced, mm. | | | | |
|---|---|---|---|---|---|---|---|
| | | | 1 min. | 2 min. | 3 min. | 4 min. | 5 min. |
| Kerosene | 5 | killing | 135 | 135 | 135 | 135 | 135 |
| Do | 20 | inhibiting | 126 | 125 | 124 | 124 | 124 |
| Kerosene 16%, Boiled Linseed oil 9.8%, "Pale OS" sulfonate 4.0%, water 70.2% | 15 | killing | 139 | 138 | 137 | 136 | 136 |
| Do | 15 | inhibiting | 85 | 85 | 84 | 83 | 82 |
| Castor oil | 5 | killing | 77 | 76 | 75 | 75 | 74 |
| Do | 5 | inhibiting | 71 | 71 | 70 | 70 | 70 |
| 2-ethyl-hexanol 50%, di-isobutyl carbinol 50% | 5 | killing | 45 | 44 | 44 | 43 | 40 |
| Do | 5 | inhibiting | 43 | 43 | 42 | 42 | 40 |
| Polyalkylene glycol ("Ucon 50-HB-3520") | 5 | killing | 92 | 91 | 91 | 90 | 88 |
| Do | 5 | inhibiting | 91 | 91 | 91 | 90 | 88 |
| Calcium stearate 40%, Polyethylene glycol 400 mono-oleate 10%, water 50% | 5 | killing | 101 | 101 | 101 | 100 | 99 |
| Do | 5 | inhibiting | 97 | 97 | 96 | 95 | 93 |
| Diethylene glycol monolaurate | 5 | killing | 151 | 150 | 150 | 150 | 150 |
| Do | 5 | inhibiting | 147 | 146 | 145 | 145 | 145 |
| "Tagol A-10" | 5 | killing | 6 | 6 | 6 | 6 | 6 |
| Do | 5 | inhibiting | 8 | 7 | 7 | 7 | 7 |
| "Tagol A-34" | 5 | killing | 15 | 15 | 15 | 15 | 15 |
| Do | 5 | inhibiting | 3 | 3 | 3 | 3 | 3 |
| "Tagol A-65" | 5 | killing | 34 | 32 | 30 | 30 | 30 |
| "Tagol A-34" 45%, Polyethylene glycol 400 mono-oleate 5%, water 50% | 5 | do | 0 | 0 | 0 | 0 | 0 |
| Do | 5 | inhibiting | 1 | 1 | 1 | 1 | 0 |
| "Tagol A-34" 80%, Polyethylene glycol 400 mono-oleate 10%, "Ucon LB-1715" 10% | 5 | killing | 3 | 3 | 3 | 3 | 3 |
| Do | 5 | inhibiting | 0 | 0 | 0 | 0 | 0 |
| "Tagol A-34" 85%, Polyethylene glycol 400 mono-oleate 10%, "Ucon LB-1715" 5% | 5 | killing | 3 | 3 | 3 | 3 | 3 |
| Do | 5 | inhibiting | 1 | 1 | 1 | 1 | 1 |

The apparatus employed consisted of a cylindrical glass column closed at the bottom with a rubber stopper. The stopper was provided with a seal through which a motor driven shaft extended. At the end of the shaft, a three-blade propeller provided a means for agitating the material in the column. In testing the "foam killing" properties of the material, 250 milliliters of a paper pulp stock having the following composition was introduced into the column:

Table II 456 parts distilled water
7 parts bleached kraft pulp
50 parts clay
7 parts $Na_2SiO_3.5H_2O$
130 parts of 10% starch jelly
80 parts of 1.2% "sodium resinate" solution
270 parts 1.8% $KAl(SO_4)_2.12H_2O$ solution The propeller was set in motion at about 7,200 r.p.m. for 10 minutes. An agitating period of 10 minutes was found to be sufficient to obtain equilibrium of the foam. After equilibrium was attained, the material to be tested was added into the rotating pulp dropwise, and the pulp was agitated for another 5 minutes to assure uniform distribution of the testing material within the pulp. The agitation was discontinued and the height of foam produced was then measured during a period of 5 minutes. The foam height was determined as the difference between the average height attained by the liquid plus the foam and the height of the liquid at rest.

To determine the foam-inhibiting effectiveness, 250 millimeters of the paper pulp stock was introduced into the column and the substance being tested was added into the pulp dropwise. The propeller was rotated at a speed of about 7,200 r.p.m. for 10 minutes. The agitation was discontinued and the height of foam produced was then measured during a period of 5 minutes.

The emulsion is prepared by weighing the required amounts of the still bottoms residue and the emulsifying agent and melting them together. After complete melting, the mixture is heated to about 180° F. with stirring. After reaching this temperature, the source of heat is removed. Tap water at a temperature of about 77° F. is then introduced slowly into the mix, with stirring. Mixing is continued until the emulsion is cooled to 100° F.

The emulsions prepared according to the present invention are quite stable, even at elevated temperatures. For example, the preferred composition consisting of 45% by weight of "Tagol A-34," 5% by weight of polyethylene glycol 400 mono-oleate, and 50% water was stable after storage for seven days at 0° F., and after storage for seven days at 100° F. When stored for seven days at 120° F., there was a slight separation, but the separated material could be readily redispersed.

The effect of pH on the performance of the compositions was investigated at pH values ranging from 3 to 10. The foam-forming system employed in this study was 0.1% of an alkylated aryl polyether alcohol ("Triton X-100") by weight in distilled water. The pH value of the foam-forming solution was lowered by the addition of sulphuric acid and raised by the addition of sodium hydroxide. About 250 millimeters of the foaming solution was placed in the column and 0.1% by weight of the defoaming agent was added to the solution. The propeller was rotated at a speed of about 7,200 r.p.m. for 10 minutes. At a pH of 3, the foaming solution itself evidenced a foam height of 100 millimeters. Under the same conditions, the addition of 0.1% by weight of the defoaming composition containing 45% by weight of the still bottoms residue of oleyl alcohol, 5% by weight of mono-oleate ester of polyethelene glycol 400, and 50% water, was effective to reduce the foam height to 12 millimeters.

At a pH of 10, the foam height produced in the foaming solution per se averaged about 135 millimeters. The addition of 0.1% of the anti-foam solution mentioned above was effective to reduce the height of the foam to 11 millimeters.

While the dosage may vary between systems depending on the severity of the foaming condition or the foaming tendency, the usual dosage for pump suspensions involves the addition of from about 0.5 to 5 parts per million of the still bottoms residue to the pulp suspension.

While the foregoing description has dealt primarily with the use of the still bottoms residue in combating foam in paper pulp suspensions, these materials are also effective foam inhibitors or foam killers in diverse aqueous systems such as cooling towers, process evaporation systems, sewage disposal systems, paint spray booths, oil well drilling muds, and the like. In fact, any aqueous system operating at atmospheric or subatmospheric pressure can be treated with the compositions of this invention.

It will also be evident that various modifications can be made to the described embodiments without departing from the scope of the present invention.

I claim as my invention:

1. The method of inhibiting foam in an aqueous medium which comprises adding to said medium a still bottoms fraction recovered from the distillation of an aliphatic alcohol containing from 12 to 20 carbon atoms per molecule after the distillation of substantially all of the alcohol containing 12 to 20 carbon atoms therefrom in an amount sufficient to inhibit substantially the tendency of said medium to foam.

2. The method of inhibiting foam in an aqueous medium which comprises adding to said medium a still bottoms fraction recovered from the distillation of an aliphatic alcohol containing 18 carbon atoms per molecule after the distillation of substantially all of the 18 carbon atom alcohol therefrom in an amount sufficient to inhibit substantially the tendency of said medium to foam.

3. The method of inhibiting foam in an aqueous medium which comprises adding to said medium a mixture of a still bottoms fraction recovered from a distillation of an aliphatic alcohol containing from 12 to 20 carbon atoms per molecule after the distillation of substantially all of the alcohol containing 12 to 20 carbon atoms therefrom and a non-ionic emulsifying agent in an amount sufficient to inhibit substantially the tendency of said medium to foam.

4. The method of inhibiting foam in an aqueous medium employed for suspending pulp fibers which comprises adding to said medium an emulsion consisting essentially of a still bottoms fraction recovered from the distillation of an aliphatic alcohol containing from 12 to 20 carbon atoms per molecule after the distillation of substantially all of the alcohol containing 12 to 20 carbon atoms therefrom and a non-ionic emulsifying agent in water in an amount sufficient to inhibit substantially the tendency of said medium to foam.

5. The method of claim 4 in which said emulsion contains about ½ to 2 parts by weight of said still bottoms fraction for every part of weight of water in said emulsion.

6. The method of claim 4 in which said emulsifying agent is present in an amount of from 1 to 10% by weight of said emulsion.

7. A composition for inhibiting foam formation in aqueous systems consisting essentially of an aqueous emulsion of a still bottoms fraction recovered from the distillation of an aliphatic alcohol containing from 12 to 20 carbon atoms per molecule after the distillation of substantially all of the alcohol containing 12 to 20 carbon atoms therefrom and a non-ionic emulsifying agent.

8. A composition for inhibiting foam formation in aqueous systems consisting essentially of an aqueous emulsion of a still bottoms fraction recovered from the distillation of an aliphatic alcohol containing 18 carbon atoms per molecule after the distillation of substantially all of the 18 carbon atom alcohol therefrom and a non-ionic emulsifying agent.

9. A composition for inhibiting foam formation in paper-making pulp suspensions consisting essentially of an aqueous emulsion containing a still bottoms fraction recovered from the distillation of an aliphatic alcohol containing from 12 to 20 carbon atoms per molecule after distillation of substantially all of the alcohol containing 12 to 20 carbon atoms therefrom and a non-ionic emulsifying agent, said still bottoms fraction being present in an amount of from ½ to 2 times the amount of water present in said emulsion.

10. A composition for inhibiting foam formation in paper-making pulp suspensions consisting essentially of an aqueous emulsion containing a still bottoms fraction recovered from the distillation of an aliphatic alcohol containing from 12 to 20 carbon atoms per molecule after the distillation of substantially all of the alcohol containing 12 to 20 carbon atoms therefrom and a non-ionic emulsifying agent, said still bottoms fraction being present in an amount of from ½ to 2 times the amount of water present in said emulsion, and said emulsifying agent being present in an amount of from 1 to 10% by weight of said emulsion.

11. A composition for inhibiting foam formation in pulp-making suspensions consisting essentially of an aqueous emulsion of a still bottoms fraction recovered from the distillation of oleyl alcohol after distillation of substantially all of the oleyl alcohol therefrom and a non-ionic emulsifying agent.

12. A composition for inhibiting foam formation in pulp-making suspensions consisting essentially of an aqueous emulsion of a still bottoms fraction recovered from the distillation of lauryl alcohol after distillation of substantially all of the lauryl alcohol therefrom and a non-ionic emulsifying agent.

13. A composition for inhibiting foam formation in pulp-making suspensions consisting essentially of an aqueous emulsion of a still bottoms fraction recovered from the distillation of ricinoleyl alcohol after distillation of substantially all of the ricinoleyl alcohol therefrom and a non-ionic emulsifying agent.

14. A composition for inhibiting foam formation in pulp-making suspensions consisting essentially of an aqueous emulsion of a still bottoms fraction recovered from the distillation of stearyl alcohol after distillation of substantially all of the stearyl alcohol therefrom and a non-ionic emulsifying agent.

15. A composition for inhibiting foam formation in pulp-making suspensions consisting essentially of an aqueous emulsion of a still bottoms fraction recovered from the distillation of linoleyl alcohol after distillation of substantially all of the linoleyl alcohol therefrom and a non-ionic emulsifying agent.

16. The composition of claim 11 in which said still bottoms fraction is present in an amount of from ½ to 2 times by weight of the water present in said emulsion.

17. A composition for inhibiting foam formation in pulp-making suspensions consisting essentially of an emulsion containing about 45% by weight of a still bottoms fraction recovered from the distillation of oleyl alcohol after distillation of substantially all of the oleyl alcohol therefrom, about 5% by weight of the mono-oleate ester of a polyethylene glycol having an average molecular weight of about 400, and the balance water.

References Cited in the file of this patent
UNITED STATES PATENTS 2,797,198      Chappell _____ June 25, 1957